United States Patent [19]

Franz

[11] 4,311,764

[45] Jan. 19, 1982

[54] POLYURETHANE SURFACE TREATMENT AND RESULTING MONOMOLECULAR LAYERED ARTICLE

[75] Inventor: Helmut Franz, Pittsburgh, Pa.

[73] Assignee: PPG Industries, Inc., Pittsburgh, Pa.

[21] Appl. No.: 192,761

[22] Filed: Oct. 1, 1980

[51] Int. Cl.³ .............................................. B32B 27/40
[52] U.S. Cl. ................................. 428/423.1; 252/49.3; 252/54.6; 427/384; 427/430.1; 427/445
[58] Field of Search .................... 428/423.1, 421, 422, 428/424.6; 252/49.3, 54.6, 58; 427/393.5, 393.1, 384, 430.1, 331, 353, 445; 264/130, 338; 156/289

[56] References Cited

U.S. PATENT DOCUMENTS

| | | | |
|---|---|---|---|
| 3,509,015 | 4/1970 | Wismer et al. | 161/190 |
| 3,808,077 | 4/1974 | Rieser et al. | 156/102 |
| 4,093,775 | 6/1978 | Szur | 428/421 |
| 4,169,904 | 10/1979 | Czornyj et al. | 252/54.6 X |
| 4,203,856 | 5/1980 | Pardee | 427/384 X |
| 4,213,870 | 7/1980 | Loran | 252/51.5 R |

*Primary Examiner*—Norman Morgenstern
*Assistant Examiner*—Thurman K. Page
*Attorney, Agent, or Firm*—Donna L. Seidel

[57] ABSTRACT

A method for producing a lubricating, nonreactive surface layer on polyurethane by adsorption of a nonreactive species is disclosed.

10 Claims, No Drawings

POLYURETHANE SURFACE TREATMENT AND RESULTING MONOMOLECULAR LAYERED ARTICLE

BACKGROUND OF THE INVENTION

1. Field of the Invention

The present invention relates generally to the art of processing polyurethane and more particularly to the art of providing effective release between polyurethane and other surfaces.

2. The Prior Art

U.S. Pat. No. 3,509,015 to Wismer et al discloses fabricating bilayer safety glass by casting a polyurethane film between a glass sheet and a mold coated with a release agent to facilitate separation of the polyurethane surface from the mold. No particular release agents are suggested.

U.S. Pat. No. 3,808,077 to Rieser et al discloses fabricating bilayer safety glass by assembling a preformed plastic sheet between a glass sheet and a mold coated with a release agent such as polyvinyl fluoride, polyethylene glycol terephthalate, organopolysiloxanes and high silica content glass resins.

U.S. Application Ser. No. 49,673 filed June 18, 1979 now U.S. Pat. No. 4,277,299 discloses laminating a preformed thermoplastic sheet to a glass sheet using a glass pressing mold with an optically smooth coating of a silicon-based polymeric release agent to facilitate separation of the laminate from the mold without impairing the optical quality of the plastic surface.

U.S. Application Ser. No. 65,797 filed Aug. 13, 1979 now U.S. Pat. No. 4,276,350 discloses reducing the reactivity of a glass surface with a molecular layer of a fluorocarbon bonded to metal ions adsorbed at the glass surface.

SUMMARY OF THE INVENTION

The present invention involves a method for sealing and passivating a polyurethane surface by chemisorbing and/or adsorbing a molecular layer of a carboxylated fluorosurfactant at the polyurethane surface. The molecular layer of fluorosurfactant provides lubrication at the interface between the polyurethane and a pressing plate in pressing operations and also facilitates release of the polyurethane surface from pressing plates in pressing and laminating operations.

DESCRIPTION OF THE PREFERRED EMBODIMENTS

Polyurethane surfaces typically have a high coefficient of friction and are reactive toward various contaminants which may be encountered in conventional processing operations. Therefore, in processing operations such as pressing and laminating, it is very important to protect the polyurethane surface, particularly if a transparent final product is the objective.

Hence, it is especially desirable to provide a nonreactive, lubricating interface between the polyurethane surface and any other surface which it contacts in order to facilitate separation of the polyurethane without damaging its surface. Generally this interface has been obtained by coating pressing plates, molds, etc., which contact the polyurethane with a release agent such as silanes, siloxanes or silicones.

According to the present invention a lubricating, nonreactive interface which promotes easy separation of a polyurethane surface from other surfaces it contacts during conventional processing operations is enhanced by establishing a lubricating, nonreactive surface on the polyurethane. Thus, the polyurethane itself is in effect a release surface.

Forming a lubricating, nonreactive surface on the polyurethane is accomplished by chemisorbing a lubricating nonreactive species at the polyurethane surface. Preferably, a carboxylated fluorosurfactant is chemisorbed at the polyurethane surface to produce a substantially monomolecular layer of the fluorosurfactant which is lubricating and nonreactive.

The nonreactive species chemisorbed at the polyurethane surface forms a substantially monomolecular layer, rather than a film, which provides lubrication and release properties to the polyurethane surface without impairing the optical quality or permitting transfer of excess release agent to another surface. The term "nonreactive species" as used herein refers to a compound which is chemisorbed and/or adsorbed by the polyurethane surface, presumably by interaction of a functional moiety such as carboxyl groups with reactive sites on the polyurethane surface and which comprises a nonreactive moiety, for example fluorocarbon groups, which creates the nonreactive surface.

The nonreactive species useful according to the present invention may be characterized as materials which are chemisorbed and/or adsorbed at a polyurethane surface to form a substantially monomolecular layer which is lubricating and nonreactive to the extent of enhancing the separation of the polyurethane from other surfaces contacted in the course of typical processing operations, such as pressing plates and molds. An essentially monomolecular layer is believed to be optimum because the nonreactive species is essentially oriented with the nonreactive moiety forming the surface. Excess material, not chemisorbed at the polyurethane surface, could be less specifically oriented.

Preferred nonreactive species include carboxylated fluorosurfactants, particularly anionic moderately carboxylated fluorosurfactants. The degree of carboxylation is characterized, for purposes of the present invention, by infrared analysis of the ratio of carboxyl to $CF_2$ groups and is expressed as $\log I (COOH)/\log I (CF_2)$ wherein I is the ratio of intensity of incident radiation to the intensity of emergent radiation for the given absorption bands, measured at 6.1 microns for the carboxylate and 15.5 microns for the fluorocarbon. Values $\leq 0.2$ represent slight carboxylation, while values between 0.2 to 1.0 represent moderate carboxylation. The preferred anionic, moderately carboxylated fluorosurfactants also exhibit, by infrared analysis, substantially no unsaturation or lengthy methylene groups, defined for purposes of the present invention as groups containing more than four carbon atoms.

The polyurethane surface is preferably treated with the nonreactive species in the form of a dilute solution in a compatible solvent. The concentration of the nonreactive species is preferably from about 0.01 to about 10 percent, more preferably from about 0.01 to about 5 percent, and most preferably from about 0.01 to about 1.0 percent. Concentrations below 0.01 percent may simply require a longer adsorption time, while concentrations higher than the preferred may result in excess fluorosurfactant at the surface which may transfer to other surfaces or render a smeared appearance to the polyurethane surface.

Solvents useful according to the present invention include any solvent for the nonreactive species which has no deleterious effects on the polyurethane. Preferred solvents include water, alcohols, and mixtures thereof, particularly lower alkyl alcohols such as methanol, ethanol, propanol and isopropanol. For practical, economic, health and safety reasons water is a preferred solvent.

The solution of the nonreactive species may be applied to the polyurethane surface by any conventional techniques such as spraying, flooding, brushing, etc. A preferred technique is dipping the polyurethane into a dilute solution of the nonreactive species, preferably rinsing with demineralized water and allowing the surface to dry.

The polyurethane surface is in contact with the solution of the nonreactive species for a sufficient time to allow chemisorption of an essential monomolecular layer of the nonreactive species at the polyurethane surface. In general, a few seconds to a few minutes of contact is sufficient. Contact for about 10 seconds to about 1 minute is preferred.

The present invention will be further understood from the descriptions of specific examples which follow.

EXAMPLE I

A polyurethane surface is treated by a one minute dip at ambient temperature into a one percent solution in isopropanol of an essentially saturated, anionic, moderately carboxylated fluorosurfactant available from Du Pont de Nemours and Company, Wilmington, Delaware under the name of ZONYL ® FSP. The sample is drained and dried. The fluorosurfactant is chemisorbed by the polyurethane surface to form a lubricating nonreactive surface layer which is invisible, does not affect the optical properties of the polyurethane and is believed to be essentially monomolecular. The sample is then subjected to an autoclave cycle with the treated polyurethane surface in contact with release surfaced pressing plates. After autoclaving, the sample exhibits excellent release from the pressing plate and excellent surface condition.

EXAMPLE II

A large polyurethane surface is treated with an aqueous solution of 0.01 percent fluorosurfactant as in Example I. The treated surface is placed in contact with a siloxane coated pressing plate. After press polishing, the polyurethane exhibits excellent release from the pressing plate and excellent surface conditions.

The above examples are offered to illustrate the present invention, the scope of which is defined by the following claims.

What is claimed:

1. A method for treating polyurethane to produce a lubricating, nonreactive surface layer which comprises contacting the polyurethane surface with a carboxylated fluorosurfactant capable of chemisorption at the polyurethane surface for a sufficient time to enable chemisorption of the carboxylated fluorosurfactant by the polyurethane to form a lubricating, nonreactive surface layer.

2. The method according to claim 1, wherein the carboxylated fluorosurfactant is a moderately carboxylated anionic fluorosurfactant.

3. The method according to claim 2, wherein the carboxylated fluorosurfactant is an essentially saturated, moderately carboxylated, anionic fluorosurfactant without lengthy methylene groups.

4. The method according to claim 3, wherein the polyurethane is treated with a dilute solution of the carboxylated fluorosurfactant.

5. The method according to claim 4, wherein the solvent is selected from the group consisting of water, alcohols and mixtures thereof.

6. The method according to claim 4, wherein the concentration of the carboxylated fluorosurfactant is from about 0.01 to about 5 percent.

7. The method according to claim 1, wherein a polyurethane surface is treated with an aqueous solution of 0.01 to 1 percent of an essentially saturated anionic, moderately carboxylated fluorosurfactant.

8. A polyurethane article having a lubricating nonreactive surface layer prepared by the chemisorption of a carboxylated fluorosurfactant at the polyurethane surface.

9. The article according to claim 8, wherein the carboxylated fluorosurfactant is an essentially saturated, anionic, moderately carboxylated fluorosurfactant.

10. The article according to claim 9, wherein the carboxylated fluorosurfactant is adsorbed at the polyurethane surface in a molecular layer.

* * * * *